(12) United States Patent
Hu et al.

(10) Patent No.: US 8,015,180 B2
(45) Date of Patent: Sep. 6, 2011

(54) QUERIES WITH HARD TIME CONSTRAINTS

(75) Inventors: Ying Hu, Nashua, NH (US); Seema Sundara, Nashua, NH (US); Jagannathan Srinivasan, Nashua, NH (US)

(73) Assignee: Oracle International Corp., Redwood Shores, CA (US)

( * ) Notice: Subject to any disclaimer, the term of this patent is extended or adjusted under 35 U.S.C. 154(b) by 520 days.

(21) Appl. No.: 11/804,508

(22) Filed: May 18, 2007

(65) Prior Publication Data
US 2008/0288473 A1 Nov. 20, 2008

(51) Int. Cl.
*G06F 17/30* (2006.01)
(52) U.S. Cl. .............................. 707/719; 707/720
(58) Field of Classification Search .................. None
See application file for complete search history.

(56) References Cited

U.S. PATENT DOCUMENTS

| | | | |
|---|---|---|---|
| 6,816,853 B1 * | 11/2004 | Agarwal et al. | 707/714 |
| 2004/0002956 A1 | 1/2004 | Chaudhuri et al. | |
| 2004/0003004 A1 | 1/2004 | Chaudhuri et al. | |
| 2005/0097078 A1 * | 5/2005 | Lohman et al. | 707/2 |
| 2005/0165748 A1 * | 7/2005 | Ting et al. | 707/3 |
| 2006/0075304 A1 * | 4/2006 | Canning et al. | 714/38 |
| 2008/0181536 A1 | 7/2008 | Linden | |

OTHER PUBLICATIONS

Hou et al. (ACM SIGMOD vol. 18 , Issue 2, Jun. 1989, pp. 68-77).*
US Non-Final Office Action having a notification date of Jun. 9, 2009 in co-pending U.S. Appl. No. 11/804,502, filed May 18, 2007.
USPTO Non-Final Office Action in co-pending U.S. Appl. No. 11/804,502, filed May 18, 2007 having a notification date of Sep. 24, 2010.
US Office Action dated Jan. 13, 2010 in co-pending U.S. Appl. No. 11/804,502, filed May 18, 2007.
Lee, et al., "Distributed Processing of Time-Constrained Queries in CASE-DB*", Proceedings of the fifth international conference on Information and Knowledge Management, Nov. 1996, pp. 279-287.
USPTO Final Office Action in co-pending U.S. Appl. No. 11/804,502, filed May 18, 2007, having a notification date of Jul. 22, 2010.
Hu, et al, "Supporting Time-Constrained SQL Queries in Oracle, Proceedings of the 33rd International Conference on Very Large Data Bases, Sep. 23, 2007", pp. 1207-1218.
US Patent and Trademark Office Notice of Allowance in co-pending U.S. Appl. No. 11/504,502, filed May 18, 2007, having a notification date of Jan. 11, 2011.

* cited by examiner

*Primary Examiner* — Charles Kim
*Assistant Examiner* — Anteneh Girma
(74) *Attorney, Agent, or Firm* — Kraguljac & Kalnay, LLC

(57) ABSTRACT

Systems, methodologies, media, and other embodiments associated with supporting queries with hard time constraints are described. One exemplary system embodiment includes logic for accepting a query having a hard time constraint. The example system may also include logic for selectively rewriting the query having the hard time constraint into a query having a row limitation or a sample percentage limitation. In one example, the row limitation or sample percentage limitation are computed by repetitively comparing an estimated query execution time to the hard time constraint. The example system may also include logic for establishing a timer(s) associated with the rewritten query.

22 Claims, 5 Drawing Sheets

QUERIES WITH HARD TIME CONSTRAINTS

CROSS-REFERENCE TO RELATED APPLICATION

This application is related to the following U.S. patent application, which is assigned to the present assignee: Titled "QUERIES WITH SOFT TIME CONSTRAINTS", Ser. No. 11/804,502 filed May 18, 2007, inventors: Y. Hu, S. Sundara, & J. Srinivasan.

BACKGROUND

Databases continue to grow. Query languages (e.g., structured query language (SQL)) facilitate producing arbitrarily complex queries that may take inordinate and/or unknowable amounts of time to complete in these growing databases. Conventional strategies to limit the impact of such queries involve a user specifying how to limit a query (e.g., return the "first-few rows", return "a sample of rows"). However, these strategies require increased sophistication from users and may still produce queries having unknown or unpredictable query processing times.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
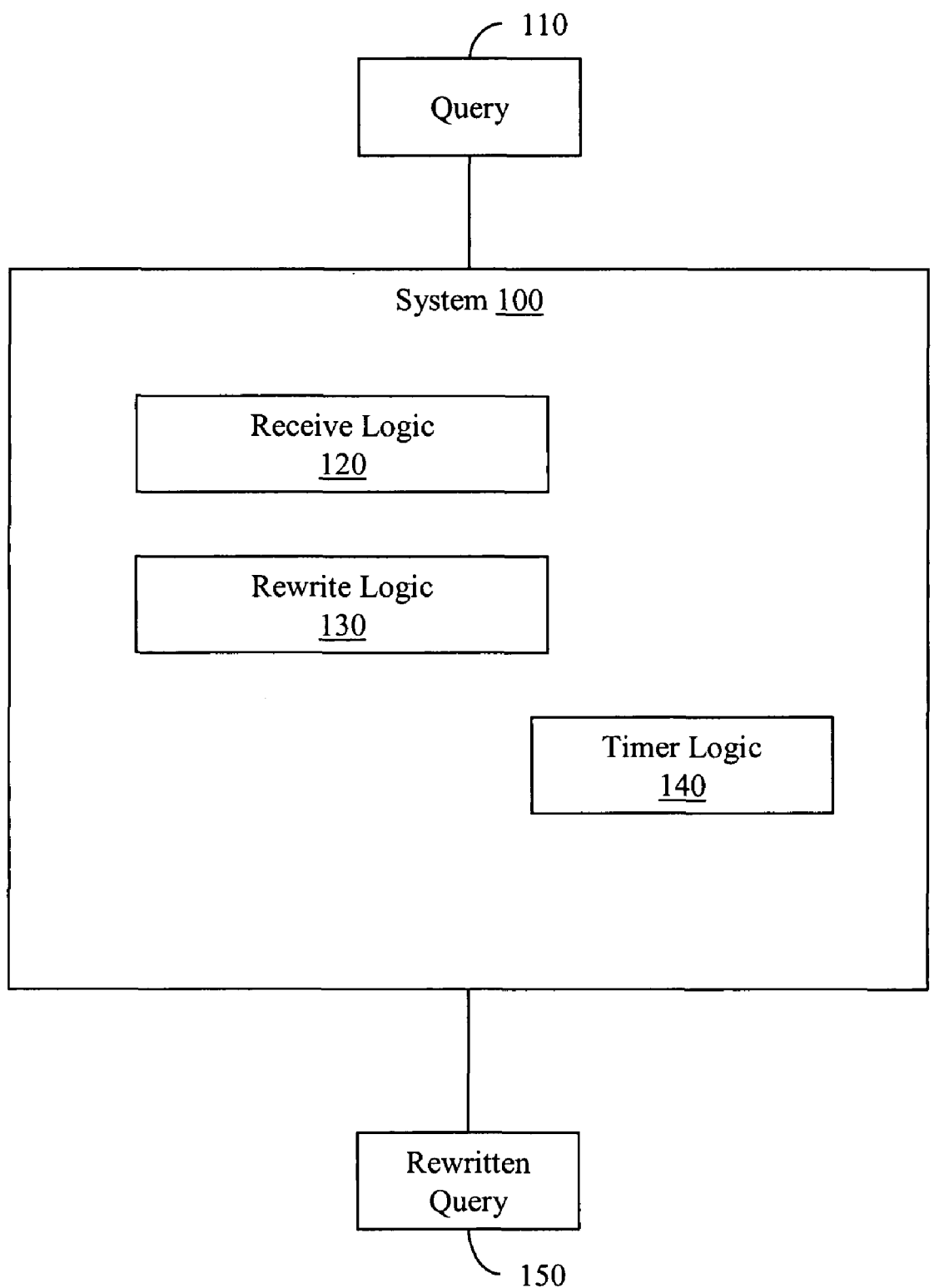
FIG. 1 illustrates an example system to support time-constrained queries.

Example systems and methods support processing time-constrained queries. The time-constrained queries are to be executed in a defined period of time. Thus, example systems and methods may accept a query (e.g., SQL query) that includes a hard time constraint that will be treated as an upper bound for query processing time. A hard time constraint is a period of time after which a query will terminate. The query may also indicate the type of results (e.g., partial, approximate) that the query is to produce if tradeoffs are to be made between accuracy, completeness, and constrained execution time. When tradeoffs are to be made, example systems and methods may internally transform a query and associate timers with portions of the transformed query so that the query will be guaranteed to complete in the amount of time associated with the hard time constraint.

A DBMS (database management system) may generate a query execution plan. The query execution plan may be analyzed to determine how long the plan is expected to take to complete. The analysis may be performed at the top level (e.g., total time) and at lower levels (e.g., time for a portion of a plan). If a transformation of the query is to be made, different transformation types are possible. If partial results are acceptable in a response to the query, then a number of rows less than all the rows can be returned. If approximate results from which estimates concerning the entire set of rows can be made are acceptable in response to the query then sampling of a data set(s) (e.g., table(s)) may be employed. When sampling is employed, results may be approximate. Therefore, example systems and methods may include logic to provide additional data concerning estimated aggregate values and a confidence interval associated with an estimated aggregate value.

To support identifying hard time constraints, example systems and methods may process an additional clause in a query (e.g., SQL query). The additional clause may specify a hard time constraint that provides a time limit for a query to execute. When a time constraint is included in a query, a DBMS configured with example systems and/or methods may generate a query execution plan. The query execution plan can describe the actions that will be taken to execute a query. This may include retrieving rows from tables, sorting rows, determining aggregate values for a table, and so on. The query execution plan may include predicted times for the various parts of the plan.

Some actions may be referred to as "blocking" operations. A blocking operation is an operation that does not produce any rows until it has consumed at least one of its inputs completely. Looked at another way, a blocking operation is an operation that cannot start to return its result until a previous operation has completed. Consider a sort operation. A sort cannot begin to return any sorted data until all the data it is supposed to sort is available. Additionally, some sorts cannot return any sorted data until they have sorted all the data. Thus, a sort may be referred to as a blocking operation.

If a query execution plan indicates that the query is going to take longer than the time allowed by the hard time constraint, then example systems and methods may rewrite the query and protect an execution action(s) with a timer(s) until it can be determined that the query will execute within the hard time constraint. This rewriting may include limiting row selection from a table(s) according to different methods (e.g., row number limitation, sampling clause). This rewriting may also include selecting tables for which row selection will be limited (e.g., fact table in foreign key join). Executing the rewritten query may involve performing several actions. To guarantee the rewritten query will complete within the hard time constraint, a timer(s) may be established and associated with the rewritten query.

A first timer may be referred to as a "top-level" timer. The top-level timer may be associated with the overall execution time. When the top-level timer expires, execution of the rewritten query may be terminated and whatever results are available, if any, may be provided. A second timer may be associated with a blocking operation associated with the rewritten query.

Consider a query that is to sort results. A time Tsort required to sort N rows may be known. A hard constraint time Tconstraint may also be known. The time Tselect to select all rows from a table may not be known. However the time Tselect can be estimated. If Tconstraint>(Tsort+Tselect), then a query may not need to be rewritten. But if Tconstraint<(Tsort+Tselect), then a query may have to be rewritten and execution of the rewritten query may need to be controlled by a timer(s). Thus, a top level timer may be set to Tconstraint. A blocking operation timer may also be set in the sort operation so that it can stop its child operation (the select operation) whose results are to be sorted. This blocking operation timer may be set to Tselect=(Tconstraint−Tsort). Rather than simply stop the select operation upon the expiration of timer Tselect, a row selection limitation may be established for a table associated with Tselect. Thus, a row number limitation or a sample percentage limitation may be added to the select operation for a table. In this way, a query and/or a query action may terminate gracefully rather than forcefully. Additionally, graceful (e.g., controlled, programmed) termination facilitates providing knowledge about the nature of the results produced in the Tselect time period. For example, it may be known whether the results are partial results (e.g., first N rows encountered) or sampled results (e.g., N random rows selected from a table). This knowledge may facilitate evaluating the quality of the returned results.

Thus, example systems and methods may take two different approaches based on whether approximate results are returned or whether partial results are returned. When approximate results are returned, the top-level timer for the whole SQL statement may be set as the hard time constraint and timers for blocking operations may be set based on the analysis of explain plan for the rewritten query. When partial results are returned, the top-level timer for the whole SQL statement may be set as the hard time constraint and the value of RNO (in the ROWNUM<RNO clause) may be adjusted at each blocking operation down to which the ROWNUM<RNO clause is pushed.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a medium that participates in directly or indirectly providing signals, instructions and/or data. A computer-readable medium may take forms, including, but not limited to, non-volatile media, and volatile media. Non-volatile media may include, for example, optical or magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, a CD-ROM, other optical medium, a RAM, a ROM, an EPROM, a FLASH-EPROM, or other memory chip or card, a memory stick, and other media from which a computer, a processor or other electronic device can read.

"Logic", as used herein, includes but is not limited to hardware, firmware, software in execution, and/or combinations of each to perform a function(s) or an action(s), and/or to cause a function or action from another logic, method, and/or system. Logic may include a software controlled microprocessor, discrete logic (e.g., an application specific integrated circuit (ASIC)), an analog circuit, a digital circuit, a programmed logic device, a memory device containing instructions, and so on. Logic may include a gate(s), combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities (e.g., processor, operating system, logic, software). Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions in execution that cause a computer, processor, or other electronic device to perform functions, actions and/or behave in a desired manner. The instructions may be embodied in various forms including routines, algorithms, modules, methods, threads, and/or programs including separate applications or code from dynamically linked libraries. Software, whether an entire system or a component of a system, may be embodied as an article of manufacture and maintained or provided as part of a computer-readable medium as defined previously.

"User", as used herein, includes but is not limited to one or more persons, software, computers or other devices, or combinations of these.

FIG. 1 illustrates a system 100 to support time-constrained queries. System 100 includes a receive logic 120 to receive a query 110. Query 110 may have a clause that specifies a hard time constraint.

System 100 includes a rewrite logic 130 to selectively manipulate the received query 110 into a rewritten query 150. How the query 110 is to be manipulated by rewrite logic 130 may depend on the time constraint and information gathered about an execution plan for the query 110. The execution plan may describe the amount of time a query proposed by the rewrite logic 130 will consume. The execution plan may be provided by a DBMS. The execution plan may describe an overall time for a proposed query and times associated with smaller actions involved in executing a proposed query. Based on the predicted execution time, the rewrite logic 130 may further rewrite a proposed query until an execution time within the hard time constraint is achieved. This query may then be provided as rewritten query 150.

Additionally, system 100 may include a timer logic 140. Timer logic 140 may establish and initialize a timer(s) to guarantee that rewritten query 150 will complete within the hard constraint time. A top level timer may be established for a rewritten query 150. When rewritten query 150 is executed, the top level timer will insure that no more time than the amount indicated in the hard time constraint in query 110 is consumed.

System 100 may support creating and/or executing a time-constrained SQL query by transforming (e.g., rewriting) a query based on a cost-based optimizer estimate of the processing time for the rewritten query. In one example, receive logic 120 may accept an SQL SELECT statement that has been extended by a TIME CONSTRAINT (T) clause (where T indicates time in seconds). The resulting query syntax may appear as:

SELECT . . . FROM . . . WHERE . . . .
GROUP BY . . . HAVING . . . .
ORDER BY . . . .
HARD TIME CONSTRAINT (T);
WITH {APPROXIMATE|PARTIAL}RESULT;

A default "approximate" result may be applied if no approximate/partial identifier is provided.

To support executing a query within the time specified in a hard time constraint, rewrite logic 130 may produce rewritten query 150 from query 110 by adding a ROWNUM clause that reduces the result set size, and/or adding a SAMPLE clause that reduces the data blocks scanned and the intermediate result size returned from the referenced table(s).

In one example, query 110 may include a clause that identifies a preference for partial results or approximate results. Thus, the ROWNUM clause approach may be used for partial results and the SAMPLE clause approach may be used for approximate results. Rewrite logic 130 may determine for which table(s) a ROWNUM or SAMPLE clause is to be produced and may also determine an amount by which row selection from the tables is to be limited. This amount may be provided as a value for a parameter associated with the ROWNUM or SAMPLE clause. For example, rewrite logic 130 may select a number of rows (e.g., R) to be retrieved and/or a percent chance (e.g., S) for an item (e.g., row, block of rows) to be included in a sample. A ROWNUM clause having the value R may be added to rewritten query 150. Similarly, a SAMPLE clause having the value S may be added to rewritten query 150.

In the following example, query Q1 may correspond to query 110 and query Q1-T may correspond to rewritten query 150. Consider the following time-constrained SQL query:

Q1:
SELECT salary
FROM employees
HARD TIME CONSTRAINT (50);

The query Q1 is constrained to be completed in less than 50 seconds. There is no blocking operation and only one action and thus timer logic 140 may only establish a top level timer for Q1-T. If it is known that the select would exceed the time constraint, then row selection may be controlled by adding a clause (e.g., rownum, sample) to rewritten query 150. This facilitates controlling how selection is limited and thus facilitates controlled, planned termination rather than simply halting execution when a timer expires. In one example, rewrite logic 130 may transform Q1 to:

Q1-T:
SELECT salary
FROM employees SAMPLE BLOCK (10);

In Q1-T, the sample clause specifies the percentage of the sample size. Thus, in query Q1-T, only about 10% of table blocks are accessed in computing the average, which may reduce the overall query processing time to an amount near the hard time constraint. Thus, adding the SAMPLE BLOCK clause to query Q1-T is expected to cause the transformed query to complete in the constraint time period. However, an expectation is insufficient for a hard time constraint. Thus, timer logic 140 may establish a timer in system 100 or elsewhere that will be associated with rewritten query Q1-T.

When query Q1-T executes, this timer will ensure that query Q1-T consumes no more than the hard time constraint period of time. Thus, in addition to providing a rewritten query 150, system 100 may also provide a timer associated with rewritten query 150. Providing a timer may include, for example, instantiating a timer, initializing a timer, placing a value in a register, controlling a logic to establish a timer, sending a signal to a circuit, sending a message to a timer server, and so on. The timer may be implemented in entities including, for example, an operating system, an application, a DBMS, a motherboard, a circuit, and so on. The timer may be implemented, for example, in hardware and/or software.

Rewrite logic 130 may select numbers of rows or sample sizes for queries that involve multiple tables. Additionally, rewrite logic 130 may determine which tables, if any, should be sampled in a multi-table situation. In one example, for queries involving joins of tables via a foreign key, the rewrite logic 130 may determine to apply a sampling clause to just a fact table.

To review, FIG. 1 illustrates a system 100 having a receive logic 120 to receive a first query 110 having a hard time constraint. The hard time constraint may be considered as an upper bound for the execution time of the first query 110. System 100 may also include a rewrite logic 130 to selectively produce a rewritten query 150 based on the first query 110. Rather than have a time constraint clause, the rewritten query 150 may have a restricted result clause determined by a predicted execution time. System 100 may also have a timer logic 140 to establish a timer(s) associated with rewritten query 150 and/or portions thereof. A timer(s) may be held in system 100 and/or may be held in a location outside system 100. The execution of rewritten query 150 is to be controlled, at least in part, by the timer.

Example queries are examined below. In a first query, approximate results may be returned. Consider the following query:

select e.salary, l.name
from employee e, location l;
where e.loc_id=l.loc_id
hard time constraint (50);
assume that e.loc_id=l.loc_id is a foreign-key/primary-key join)

This query may be rewritten as:
select e.salary, l.name
from employee sample block (10) e, location l
where e.loc_id=l.loc_;

If the best join is a nested loop join, then example systems and methods may only establish a top-level timer. Since there is no blocking operation in the nested loop join.

If the best join is a hash join, then example systems and methods may establish a top-level timer and may also establish a timer for hash-build operation because the hash-build is a blocking operation and the hash-probe is not. Execution requires building the full hash buckets in the hash-build operation and then pipelining results from the hash-probe operation.

If the best join is a sort-merge join, then example systems and methods may establish a top-level timer and two other timers, of which a first timer may be associated with the sort operation of the employee table and the other may be associated with the sort operation of the location table.

In the following query, partial results may be returned.
select e.salary, l.name
from employee e, location l;
where e.loc_id=l.loc_id
hard time constraint (50) with partial result;
This query may be rewritten as:
select * from (select e.salary, l.location
from employee e, location l;
where e.loc_id=l.loc_id
where rownum <1000;

If the best join is a nested loop join then there will be no blocking operation and thus example systems and methods may only establish a top-level timer. The top-level timer may be set to 50 seconds. If the best join is a hash join, the hash-build is a blocking operation. Therefore, example systems and methods may still set a top-level timer to fifty seconds. Additionally, the hash-build operation will only build ~1000 hash buckets because the (rownum<RNO) can be pushed down to the blocking operation. The value of RNO may be adjusted in the hash-build operation to adjust its portion of time.

If the best join is a sort-merge join, there are two sort operations that are blocking. Example systems and methods may still set the top-level timer to 50 seconds. Additionally, the two sort operations may be limited return the first ~1000 (not completed but sorted) rows from the two tables because the (rownum<RNO) clause can be pushed down to the two sort operations. The value of RNO may be adjusted in the sort operation to adjust its portion of time.

Figure 2:
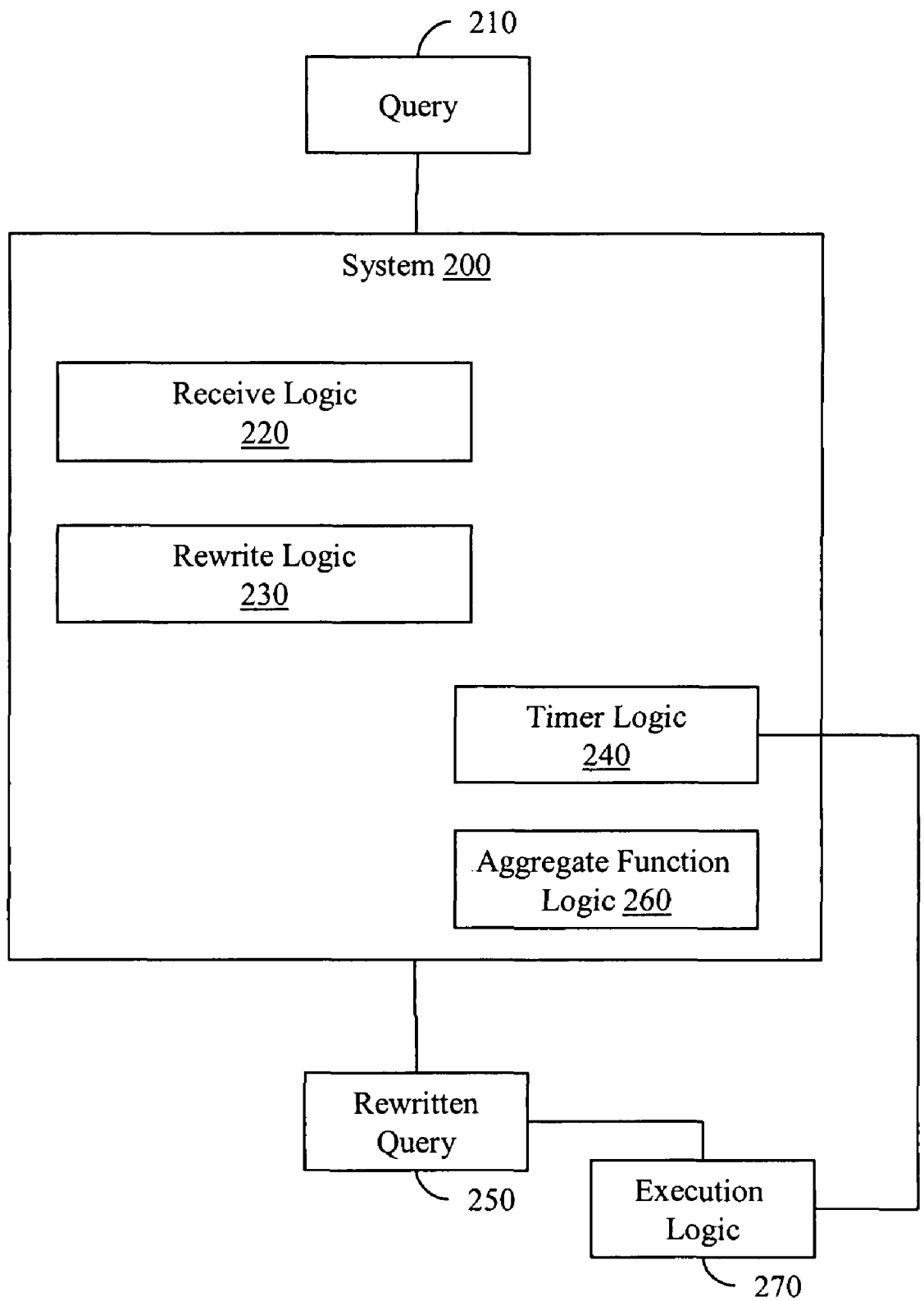
FIG. 2 illustrates another example system to support time-constrained queries.

FIG. 2 illustrates a system 200. System 200 has some elements similar to those in system 100 (FIG. 1). For example, system 200 includes a receive logic 220, a rewrite logic 230, and a timer logic 240. System 200 may receive a query 210 and selectively produce a rewritten query 250. Rewrite logic 230 may add clauses to rewritten query 250 and timer logic 240 may associated timers with portions of rewritten query 250. These timers may control at least, in part, how the rewritten query 250 is executed by an execution logic 270.

When executed, rewritten query 250 may produce partial and/or approximate results. Thus, system 200 may include an aggregate function logic 260. Aggregate function logic 260 may provide additional functions. For example, additional functions that provide values associated with an estimated sum, sum confidence, estimated count, count confidence, estimated average, and/or average confidence can provide information about how the approximate results have been computed. The information provided by these additional functions facilitates evaluating the quality and nature of approximate results. Even though a user may not have anticipated a query producing approximate results, rewrite logic 230 and/or timer logic 240 may cause rewritten query 250, when executed, to produce approximate results. The aggregate function logic 260 provides additional information that facilitates evaluating those approximate results.

System 200 may receive queries that include different actions. One action may involve a query on a single table. In this case, rewrite logic 230 may not need to rewrite query 210 and timer logic 240 may simply establish a top level timer to insure that when executed the query does not consume more than the amount of time specified in the constraint. However, even in this simple case, rewrite logic 230 may rewrite query 210 into rewritten query 250. For example, even though there is a single select on a single table, a time estimate may indicate that only a small portion of the table could be processed in the time indicated in the hard time constraint. Therefore a decision is made concerning how and how much selection is to be limited. In this case, timer logic 240 may still only establish a single timer.

System 200 may also process a query involving multiple tables that are joined on a foreign key join. In one embodiment, rewrite logic 230 may configure rewritten query 250 to limit row selection on a fact table and not to limit selection on the other dimension table. After the limited row selection has occurred, the limited results may be joined with rows from the other dimension table. In this case, timer logic 240 may establish a top level timer to guard overall execution time. Timer logic 240 may also establish another timer to limit the amount of time that can be spent on a blocking operation. This timer may insure that there is time left over after the blocking operation to do remaining processing.

System 200 may also process a query involving multiples tables that are joined not on a foreign key. In one embodiment, rewrite logic 230 may configure rewritten query 250 to limit row selection in more than one table with a goal of distributing processing time between tables equitably. In another embodiment, rewrite logic 230 may configure rewritten query 250 to limit row selection on a "fact" table or an "outer" table. Once again timer logic 240 may establish a top level timer to control overall execution time but may also establish an additional timer(s) to control the amount of time spent on a blocking operation(s).

Let $R_1$, $R_2$ be two tables to be joined, let $f_1$, $f_2$ be the sample size for the two tables respectively, and let f be the sample size corresponding to the join result. Consider samples $S_1$=SAMPLE $(R_1, f_1)$, $S_2$=SAMPLE$(R_2, f_2)$, and S=SAMPLE $(R_1$ join $R_2$, f). Since S=SAMPLE $(R_1$ join $R_2$, f) requires more time than $S_1$ join $S_2$={SAMPLE$(R_1, f_1)$ join SAMPLE$(R_2, f_2)$}, example systems and methods may implement the latter case (e.g., sampling prior to join). Rewritten query 250 may be configured to sample prior to joining and a timer(s) may be established to limit the amount of time spent sampling before joining.

Assume that $T_1$ is the total time to process $R_1$ and $T_2$ is the total time to process $R_2$. The total query time T can be simplified as:

$$T=T_1+T_2.$$

Note that $T_1$ and $T_2$ do not mean the time to simply scan $R_1$ and $R_2$. $T_1$ and $T_2$ can also include the time to sort a table and to hash-build or probe a table. In a nested loop join case, the total time to process an inner relation includes the time to scan the inner relation as many times as needed. Therefore, $t_1$ and $t_2$ can specify the time to process $S_1$ and $S_2$. In one example, $S_1$ and $S_2$ are selected by constraint rewrite logic 230 to have $t_1=t_2$, while maintaining $(t_1+t_2)<\text{Time}_{constraint}$. In one example, candidate tables are identified and initial sample sizes are selected. A table with a largest predicted processing time may be processed first. Smaller tables may then be analyzed and sample sizes selected to maintain $t_i=t_j$ with the sum of $t_i$ for =1 to n being less than the constraint time, n being the number of tables.

Query 210 may also include clauses that would result in a nested loop join, a hash join, a sort-merge join, and so on. Rewrite logic 230 may configure rewritten query 250 with a sample clause associated with the outer relation. By sampling the outer table, the inner table in effect may be sampled. In one example, timer logic 240 may also establish a timer associated with a blocking operation in the rewritten query 250.

Query 210 may also include clauses that lead to unions, differences, intersections, and so on being performed. Rewrite logic 230 may therefore add clauses to rewritten query 250 to handle these situations. In one example, rewrite logic 230 may seek to maximize f1*f2. In this example, for a SAMPLE($R_1$ union $R_2$, f) clause in query 210, example systems and methods may produce a rewritten query 250 that simplifies the operation to be SAMPLE($R_1$, $f_1$) union SAMPLE($R_2$, $f_2$) with $f_1=f_2$. Using this approach, tables may receive relatively similar ratios of processing times. Timers may be established selectively and associated with blocking operations in rewritten query 250. For a SAMPLE($R_1$-$R_2$, f) in query 210, example systems and methods may provide a rewritten query 250 that simplifies the operation be SAMPLE ($R_1$, $f_1$)–$R_2$. Only $R_1$ is sampled to avoid incorrect results. Once again, timers may be established selectively and associated with blocking operations in rewritten query 250. For a SAMPLE($R_1$ intersect $R_2$, f) in query 210, example systems and methods may provide a rewritten query 250 that simplifies the operation to be SAMPLE($R_1$, $f_1$) intersect SAMPLE ($R_2$, $f_2$). Timers may also be established selectively and associated with blocking operations in rewritten query 250. A goal of this approach may be to maximize $f_1*f_2$. This is similar to the join operation.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on.

It has proven convenient at times, principally for reasons of common usage, to refer to these signals as bits, values, elements, symbols, characters, terms, numbers, or so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, displaying, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that various actions could occur concurrently, substantially in parallel, and/or at substantially different points in time.

The illustrated elements denote "processing blocks" that may be implemented in logic. In one example, the processing blocks may represent executable instructions that cause a computer, processor, and/or logic device to respond, to perform an action(s), to change states, and/or to make decisions. Thus, the described methodologies can be implemented as processor executable instructions and/or operations provided by a computer-readable medium. In another example, the processing blocks may represent functions and/or actions performed by functionally equivalent circuits such as an analog circuit, a digital signal processor circuit, an application specific integrated circuit (ASIC), or other logic device. Flow diagrams illustrate functional information one skilled in the art could use to design/fabricate circuits, generate software, or use a combination of hardware and software to perform the illustrated processing.

Figure 3:
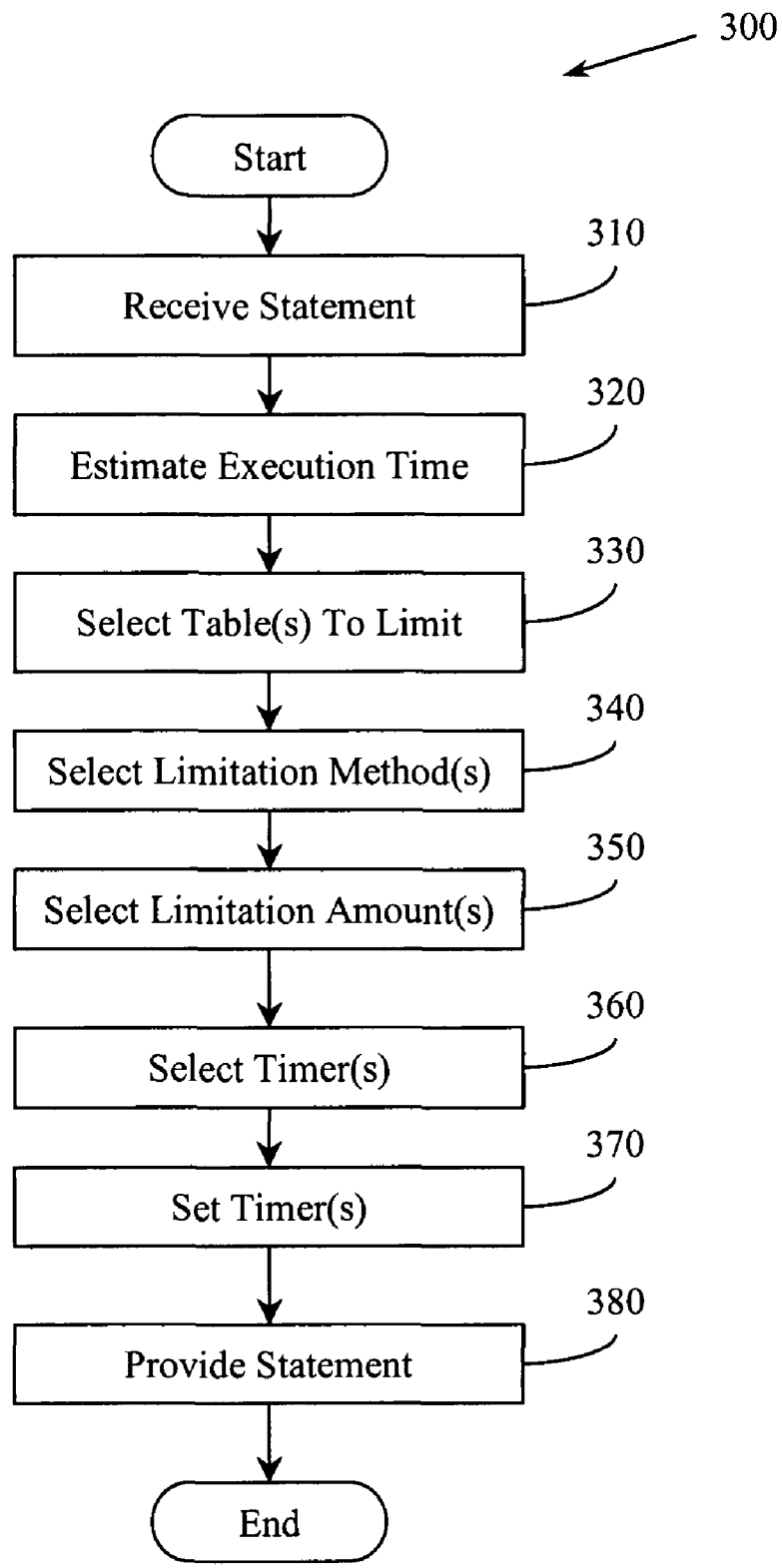
FIG. 3 illustrates an example method associated with supporting time-constrained queries.

FIG. 3 illustrates a method 300 associated with supporting time-constrained queries. Method 300 may include, at 310, receiving a statement (e.g., SQL select statement) that has a hard time constraint clause. The statement may describe conditions for selecting rows from a set of tables. Since the select statement includes a hard time constraint clause, method 300 may also include, at 320, estimating an execution time for the statement. The estimate may be based, for example, on an execution plan that provides data for the query as a whole and/or for individual actions involved in executing the query. If the estimated execution time is less than the hard time constraint, then the select statement may not be manipulated. Even though the estimate is less than the constraint, a top level timer may still be associated with the query. If the estimated execution time exceeds the time constraint, then additional processing may occur to produce a rewritten query designed to execute within the time period specified in the time constraint clause.

For example, method 300 may include, at 330, selecting a subset of tables from the set of tables. This subset includes tables from which row selection is to be limited in a rewritten query. Which tables are to be selected may depend, at least in part, on the time constraint clause and the execution time estimate.

Method 300 may also include, at 340, selecting a method by which row selection from the set of tables is to be limited. In one example, the method selected may be based, at least in part, on the time constraint clause and the execution time estimate. In another example, the method selected may be determined by a clause in the received statement. In one example, sample clauses may be associated with different table accesses while in another example a row number clause may be associated with the query as a whole.

Method 300 may also include, at 350, selecting an amount by which row selection from a member(s) of the subset of tables is to be limited. Once again the degree to which selection will be limited may be based, at least in part, on a relationship between the time constraint clause and the execution time estimate.

Method 300 may also include, at 360, selecting a timer(s) to establish. A top level timer may be selected to control the overall execution time for the statement provided at 380. Additionally, a timer may be selected for a blocking operation. This timer will be tasked with ensuring that the blocking operation begins with enough time to execute and that the blocking operation only consumes a pre-determined amount of time. While several timers are described, it is to be appreciated that one or more timers may be selected to control various portions of the execution of a query. The timers may collectively ensure that the overall execution time does not exceed the hard time constraint. A top level timer may further guarantee this constraint is not violated.

Method 300 may also include, at 370, "setting" a timer established at 360. Setting a timer may include registering the timer with an execution engine, registering the timer with an operating system, registering the timer with a DBMS, sending a message to a timer server, providing a signal to a circuit, and so on. Thus, setting the timer associates the timer with a query so that when the query is executed the timer will function and thus control, at least in part, the execution of the query.

Method 300 may also include, at 380, providing a second (e.g., rewritten, manipulated) statement that is based on the first (e.g., received) statement. The second statement may have at least one additional clause to limit selection of rows from the subset of tables. This clause may specify the amount by which selection is to be limited and the method by which selection is to be limited. Thus, method 300 receives a statement, determines whether, how, and by how much row selection is to be limited, and then provides a rewritten statement related to the received statement, where the rewritten statement is to execute within the time constraint specified in the received select statement. Additionally, method 300 establishes a timer(s) to guarantee that when the statement provided at 380 is executed that it will execute within the timer constraint.

While FIG. 3 illustrates various actions occurring in serial, it is to be appreciated that various actions illustrated in FIG. 3 could occur substantially in parallel. By way of illustration, a first process could estimate execution time, a second process could select a table to limit and a third process could select a method and amount by which the selected table would be limited. Additionally a fourth process could select, establish, and set timers. While four processes are described, it is to be appreciated that a greater and/or lesser number of processes could be employed and that lightweight processes, regular processes, threads, and other approaches could be employed.

Figure 4:
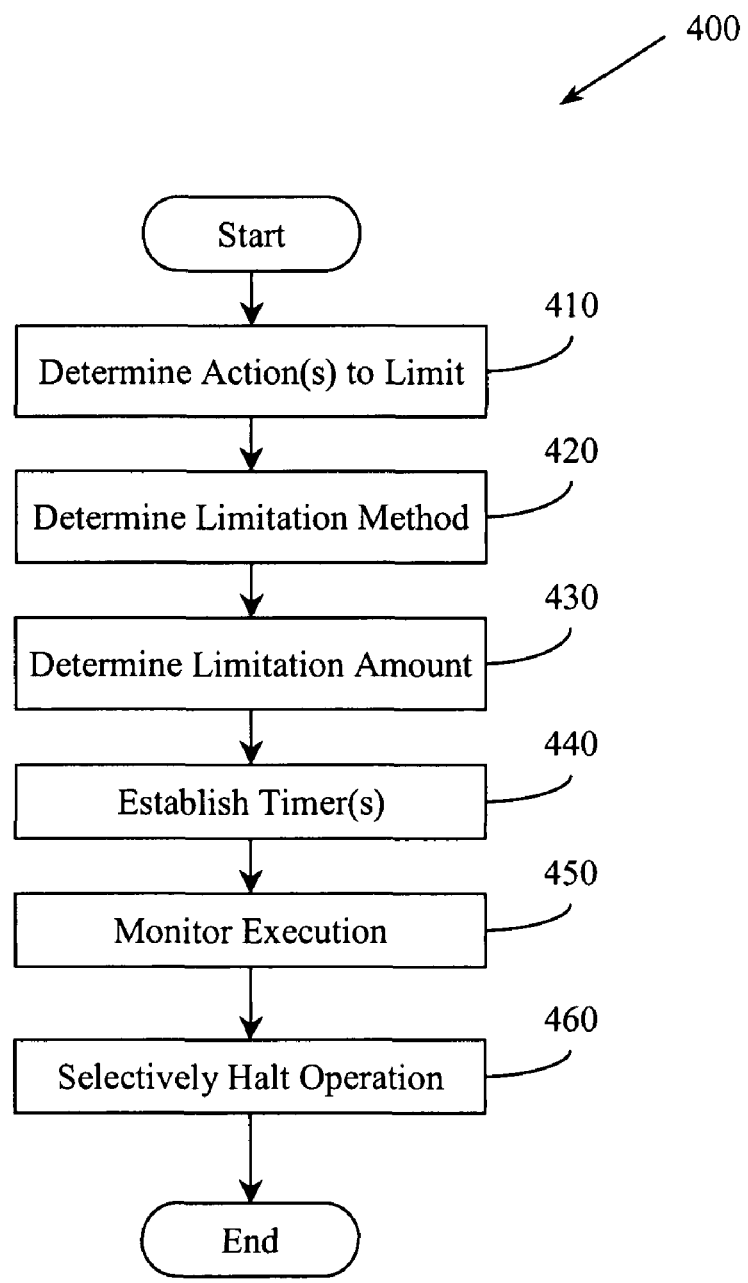
FIG. 4 illustrates an example method associated with timer-based control of statement execution.

FIG. 4 illustrates a method 400 associated with controlling execution of a statement (e.g., SQL statement) by associating a timer(s) with either the statement and/or a statement action. The statement, when executed, is to access a database table.

Method 400, may include, at 410, determining an action to limit. The action to limit is associated with the statement. The action may be, for example, selecting a row, sorting a set of rows, joining rows from different tables, and so on.

Method 400 may also include, at 420, determining a limitation method. The limitation method selected may depend on the action to be limited. Limitation methods may include, for example, limiting a number of rows accessed, sampling rows from a row space, and so on.

Method 400 may also include, at 430, determining a limitation amount. The limitation amount may depend on a relationship between the action to be limited and the amount of time available. The limitation amount may also depend on other limitations imposed on other actions. When multiple actions are to occur to execute a statement, a set of limitations, limitation methods, and limitation amounts may be determined.

Method 400 may also include, at 440, establishing a timer to guarantee that when the statement is executed it consumes no more than an amount of time specified in a hard constraint. One example timer may be referred to as a top level timer that controls the overall execution time for a statement. Another example timer may be referred to as an action timer. An action timer may control execution time for a portion of the statement. For example, if a query will first sample two tables and then sort-merge join the results of the two samples, a first action timer may be associated with a blocking operation in a rewritten query.

In one example, method 400 may terminate after establishing the timers. In another example, method 400 may continue, at 450, by monitoring the execution of a statement for which timers have been established. When execution of the statement begins, a top level timer may be started. When execution of a portion of the statement begins, an action timer associated with that portion may be started. Method 400 may also include, at 460, selectively terminating execution of the statement based on the overall timer. Additionally, and/or alternatively, method 400 may include, at 460, selectively terminating execution of a portion of the statement based on an action timer.

Figure 5:
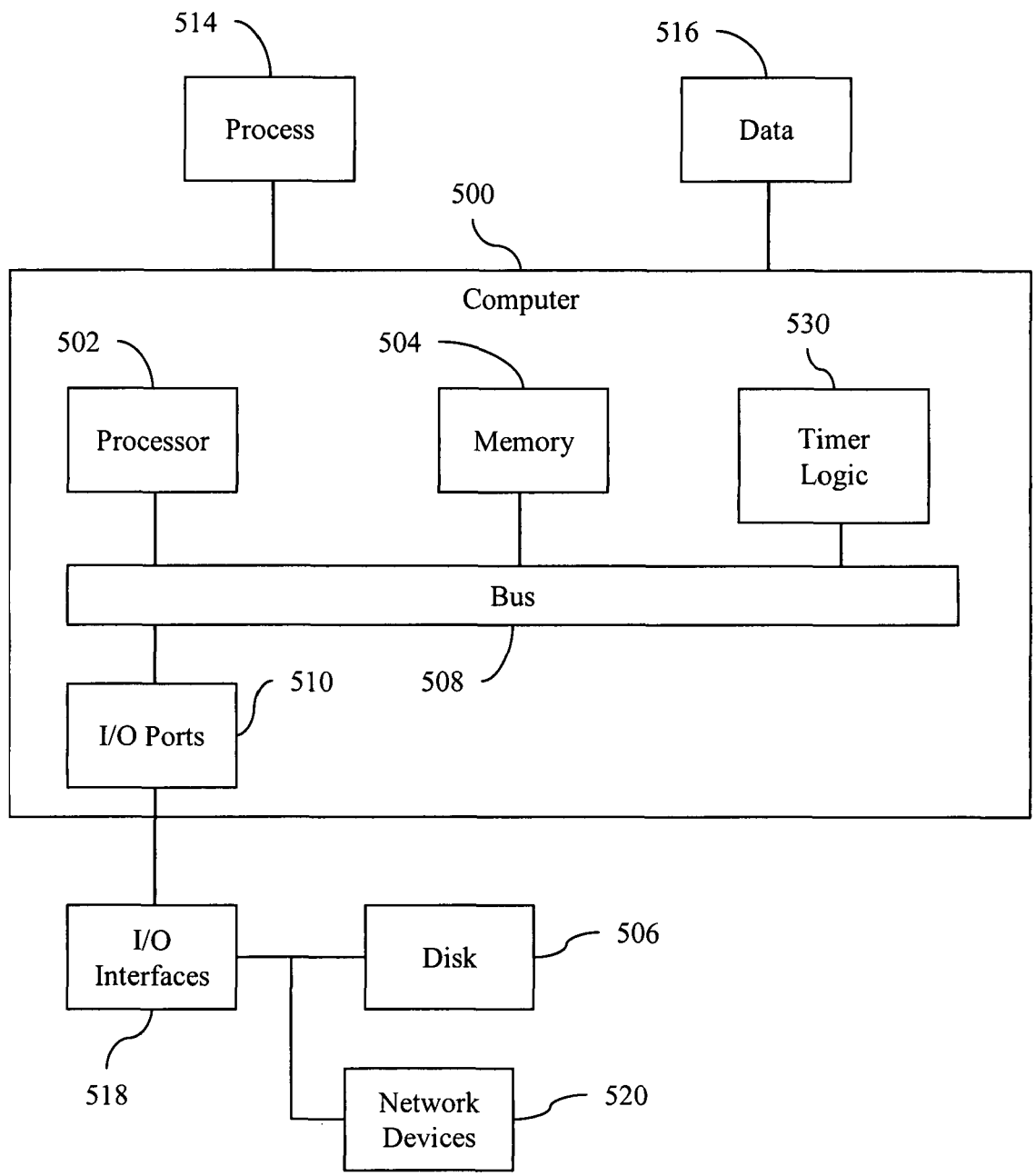
FIG. 5 illustrates an example computing environment in which example systems and methods illustrated herein can operate.

FIG. 5 illustrates an example computing device in which example systems and methods described herein, and equivalents, can operate. The example computing device may be a computer 500 that includes a processor 502, a memory 504, and input/output ports 510 operably connected by a bus 508. In one example, the computer 500 may include a timer logic 530. In one example, logic 530 may include means (e.g., hardware, software in execution, firmware) for computing a predicted execution time for a query. Logic 530 may also include means (e.g., hardware, software in execution, firmware) for selectively rewriting the query. The rewriting may be based, for example, on the predicted execution time and a time constraint. Logic 530 may also include means (e.g., hardware, software in execution, firmware) for selectively terminating a portion of the query. The selective termination may be based, at least in part, on a timer associated with the predicted execution time and the time constraint.

Generally describing an example configuration of the computer 500, the processor 502 can be a variety of various processors including dual microprocessor and other multiprocessor architectures. The memory 504 can include volatile memory and/or non-volatile memory. The non-volatile memory can include, but is not limited to, ROM, PROM, EPROM, EEPROM, and so on. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 506 may be operably connected to the computer 500 via, for example, an input/output interface (e.g., card, device) 518 and an input/output port 510. The disk 506 can include, but is not limited to, devices like a magnetic disk drive, a solid state disk drive, a floppy disk drive, a tape drive, a Zip drive, a flash memory card, and/or a memory stick. Furthermore, the disk 506 can include optical drives like a CD-ROM, a CD recordable drive (CD-R drive), a CD rewriteable drive (CD-RW drive), and/or a digital video ROM drive (DVD ROM). The memory 504 can store processes 514 and/or data 516, for example. The disk 506 and/or memory 504 can store an operating system that controls and allocates resources of the computer 500. Disk 506 and/or memory 504 may also store data 516.

The bus 508 can be a single internal bus interconnect architecture and/or other bus or mesh architectures. While a single bus is illustrated, it is to be appreciated that computer 500 may communicate with various devices, logics, and peripherals using other busses that are not illustrated (e.g., PCIE, SATA, Infiniband, 1394, USB, Ethernet). The bus 508 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 500 may interact with input/output devices via i/o interfaces 518 and input/output ports 510. Input/output devices can include, but are not limited to, a keyboard, a microphone, a pointing and selection device, cameras, video cards, displays, disk 506, network devices 520, and so on. The input/output ports 510 can include but are not limited to, serial ports, parallel ports, and USB ports.

The computer 500 can operate in a network environment and thus may be connected to network devices 520 via the i/o devices 518, and/or the i/o ports 510. Through the network devices 520, the computer 500 may interact with a network. Through the network, the computer 500 may be logically connected to remote computers. The networks with which the computer 500 may interact include, but are not limited to, a local area network (LAN), a wide area network (WAN), and other networks. The network devices 520 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and so on. Similarly, the network devices 520 can connect to WAN technologies including, but not limited to, point to point links, circuit switching networks (e.g., integrated services digital networks (ISDN), packet switching networks, digital subscriber lines (DSL)).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A system, comprising:
a rewrite logic embodied on a non-transitory computer-readable medium and configured to identify a blocking operation in a first query having a hard time constraint and to selectively produce a rewritten query based on the first query by, at least, rewriting a child operation in the blocking operation based, at least in part, on the hard time constraint, where the rewritten query includes a plurality of child operations; and
a timer logic to establish a top level timer associated with execution of the rewritten query, and one or more action timers associated with execution of the child operations in the rewritten query, where the execution of the child operations in the rewritten query is terminated on expiration of an action timer associated with the child operation, where the action timer associated with the child operation is set to a predicted execution time for the child operation.

2. The system of claim 1, where the rewritten query has a restricted result clause that depends, at least in part, on a predicted execution time.

3. The system of claim 1, the hard time constraint being one of, a numerical value representing a number of seconds, an expression that evaluates to a number of seconds, and a clock time by which the rewritten query is to complete; and
where a value of the top level timer is set to equal the hard time constraint and a value of an action timer is set to equal a predicted execution time for a child operation associated with the hard time constraint.

4. The system of claim 1, where the rewrite logic is to select a table for which row selection is to be limited, to select a method by which row selection is to be limited, and to select an amount by which row selection limit is to be limited.

5. The system of claim 1, the first query being an SQL (Structured Query Language) select statement.

6. The system of claim 1, the first query being a PL/SQL query.

7. The system of claim 1, where the first query involves a join on a foreign key of two tables, where the rewrite logic is to identify a fact table and a non-fact table in the two tables, where the rewrite logic is to manipulate the rewritten query to first limit row selection in the fact table and then to join the results of the limited row selection to the non-fact table, and where the timer logic is to selectively establish an action timer associated with a blocking operation in the rewritten query.

8. The system of claim 1, where the first query involves a join of two tables not on a foreign key, where the rewrite logic is to manipulate the rewritten query to first limit row selection and then to join results of the limited row selection, and where the timer logic is to selectively establish one or more action timers associated with one or more blocking operations in the rewritten query.

9. The system of claim 1, where the first query includes one of, a hash join and a sort-merge join of a first table R1 and a second table R2, where f1 represents a sample size for R1 and f2 represents a sample size for R2, where T1 represents a time to process R1 and T2 represents a time to process R2, where S1 represents a sample of R1 and S2 represents a sample of R2, where t1 represents a time to process S1 and t2 represents a time to process S2, and
where the rewrite logic is to produce the rewritten query so that t1=t2 and t1+t2<the time specified by the hard time constraint, and where the timer logic is to selectively establish one or more action timers associated with a blocking operation in the rewritten query.

10. The system of claim 1, where the first query includes a nested loop join of a first table R1 and a second table R2, and where the rewrite logic is to identify one of the two tables to join as an outer table, to identify one of the two tables to join as an inner table, where the rewritten query is to acquire a sample from the outer table and then to join the sample from the outer table to the inner table, and where the timer logic is to selectively establish an action timer associated with a blocking operation in the rewritten query.

11. The system of claim 1, where the first query includes a union operation between a first table R1 and a second table R2, where the rewrite logic is to configure the rewritten query with a sample(R1, f1) union sample(R2, f2) clause with f1=f2, where f1 represents a sample size for R1 and f2 represents a sample size for R2, and where the timer logic is to selectively establish an action timer associated with a blocking operation in the rewritten query.

12. The system of claim 1, where the first query includes a difference operation between a first table R1 and a second table R2, where the rewrite logic is to configure the rewritten query with a sample(R1, f1) difference R2 clause, where f1 represents a sample size for R1, and where the timer logic is to selectively establish an action timer associated with a blocking operation in the rewritten query.

13. The system of claim 1, where the first query includes an intersection operation between a first table R1 and a second table R2, where the rewrite logic is to configure the rewritten query with a sample(R1, f1) intersect sample(R2, f2) clause to maximize f1*f2, where f1 represents a sample size for R1 and f2 represents a sample size for R2, and where the timer logic is to selectively establish an action timer associated with a blocking operation in the rewritten query.

14. The system of claim 1, including an aggregate function logic to provide an estimated aggregate function and a related confidence function.

15. The system of claim 14, where the estimated aggregate function is one of, an estimated sum function, an estimated count function, and an estimated average function.

16. A non-transitory computer-readable medium storing processor executable instructions that when executed by a processor cause the processor to perform a method, the method comprising:

identifying a blocking operation in a first statement having a hard time constraint clause that includes a hard time constraint, the first statement describing a desired processing of one or more rows from a set of tables;

determining an execution time estimate for the first statement;

selecting from the set of tables a subset of tables from which row selection is to be limited, where the subset of tables is selected based, at least in part, on the hard time constraint clause and the execution time estimate;

selecting a method by which row selection from a member of the subset of tables is to be limited, where the method selected is based, at least in part, on the hard time constraint clause and the execution time estimate;

selecting an amount by which row selection from a member of the subset of tables is to be limited, where the amount selected is based, at least in part, on the hard time constraint clause and the execution time estimate;

providing a second statement based, at least in part, on the hard time constraint and having at least one additional clause to limit selection of rows from a member of the subset of tables by the selected amount according to the selected method, the second select statement being based on the first select statement and being composed of a set of sub-operations including a sub-operation associated with the blocking operation; and establishing a top level timer associated with the second statement, and one or more action timers associated with one or more sub-operations in the set of sub-operations, where execution of the second statement is controlled, at least in part, by the top level timer and the one or more action timers by selectively terminating execution of a sub-operation when an associated action timer expires, where the sub-operation associated with the blocking operation is set to an estimated execution time for the sub-operation.

17. The non-transitory computer-readable medium of claim 16, the method including:

selecting an initial number of rows to which row selection will be limited based on a comparison of the initial estimate and the hard time constraint;

selecting and analyzing a subsequent number of rows to which row selection will be limited until a time estimate falls within a threshold amount of the hard time constraint, the subsequent number of rows being based on a previous number of rows, a time estimate associated with a previous number of rows, and the hard time constraint; and selectively establishing an action timer for the sub-operation in the blocking operation associated with the second statement, where the sub-operation is a row selection and where the row selection by the blocking operation is terminated if the action timer expires.

18. The non-transitory computer-readable medium of claim 16, the method including:

selecting an initial sample percentage to which row selection will be limited for a member of the subset of tables based on a comparison of the initial estimate and the hard time constraint;

selecting and analyzing a subsequent sample percentage to which row selection will be limited for a member of the subset of tables until a time estimate falls within a threshold amount of the hard time constraint, the subsequent sample percentage being based on a previous sample percentage, a time estimate associated with a previous sample percentage, and the hard time constraint; and selectively establishing an action timer for the sub-operation in the blocking operation associated with the second statement, where the sub-operation is a row selection and where the row selection by the blocking operation is terminated if the action timer expires.

19. A method, comprising:

determining one or more of, an action to limit, a limitation method, and a limitation amount, where the action to limit, the limitation method, and the limitation amount are associated with a rewritten statement that accesses a database table, where executing the rewritten statement causes at least one action, and where the rewritten statement includes a blocking operation;

establishing a top level timer, and an action timer, where a top level timer is set to control an overall execution time for the blocking operation by terminating execution of the blocking operation based on the overall timer, and where an action timer is set to control execution time for a sub-operation in executing the blocking operation by at least terminating execution of the sub-operation when the action timer expires; and setting the action timer to a predicted time for executing the sub-operation by storing a value on a non-transitory computer-readable medium.

20. The method of claim 19, including:
identifying the blocking operation from within a query.

21. A system, comprising:

a non-transitory computer-readable medium comprising a means for computing a plurality of predicted execution times for a plurality of child operations of a query;

means for selectively rewriting the query based, at least in part, on identifying a blocking operation in the query, where rewriting the query includes rewriting a child operation in the blocking operation based, at least in part, on the plurality of predicted execution times and a time constraint;

means for establishing a top level timer, and one or more action timers, where the top level timer is set to control an overall execution time for the query, and where an action timer is set to control execution time for the child operation in the blocking operation in the query; and means for selectively terminating the child operation in the blocking operation of the query based, at least in part, on expiration of an action timer associated with a predicted execution time for the child operation in the blocking operation and the time constraint, where the action timer for the child operation in the blocking operation is set to a predicted execution time for the child operation.

22. A non-transitory computer-readable medium storing processor executable instructions that when executed by a processor cause the processor to perform a method, the method comprising:

identifying a blocking operation in a query, where the query includes a plurality of child operations and a hard time constraint;
producing a rewritten query based on the query by rewriting a child operation in the blocking operation based, at least in part, on the hard time constraint; and
establishing a top level timer associated with execution of the rewritten query, and at least one action timer associated with execution of a child operation in the rewritten query, where the execution of the child operation in the rewritten query is terminated on expiration of an action timer associated with the child operation, where an action timer associated with the child operation in the blocking operation is set to a predicted execution time for the child operation.

* * * * *

UNITED STATES PATENT AND TRADEMARK OFFICE
CERTIFICATE OF CORRECTION

PATENT NO.       : 8,015,180 B2
APPLICATION NO.  : 11/804508
DATED            : September 6, 2011
INVENTOR(S)      : Hu et al.

Page 1 of 1

It is certified that error appears in the above-identified patent and that said Letters Patent is hereby corrected as shown below:

On Title page, in column 2, under "Other Publication", line 16, delete "11/504,502," and insert -- 11/804,502, --, therefor.

In column 6, line 33, delete "assume" and insert -- (assume --, therefor.

In column 6, line 33, delete "1.loc_id" and insert -- I.loc_id --, therefor.

In column 6, line 38, delete "I.loc_;" and insert -- I.loc_id; --, therefor.

In column 6, line 60, delete "I.location" and insert -- I.name --, therefor.

In column 6, line 62, delete "I.loc_id" and insert -- I.loc_id) --, therefor.

In column 7, line 23, delete "associated" and insert -- associate --, therefor.

In column 8, line 40, delete "for =1" and insert -- for i=1 --, therefor.

In column 11, line 20, delete "400," and insert -- 400 --, therefor.

Signed and Sealed this
Sixth Day of December, 2011

David J. Kappos
*Director of the United States Patent and Trademark Office*